United States Patent [19]
Berndt

[11] Patent Number: 6,058,557
[45] Date of Patent: May 9, 2000

[54] FUGITIVE DUST COLLECTOR

[75] Inventor: David K. Berndt, Tecumseh, Mich.

[73] Assignee: Holnam, Inc., Dundee, Mich.

[21] Appl. No.: 09/016,698

[22] Filed: Jan. 30, 1998

[51] Int. Cl.⁷ .............................. A47L 5/38; B63B 27/00
[52] U.S. Cl. .......................................... 15/314; 414/139.4
[58] Field of Search ................................. 15/314, 415.1, 15/406; 414/137.1, 139.4, 140.5, 140.7, 140.9, 291, 137.4, 137.9, 142.2

[56] References Cited

U.S. PATENT DOCUMENTS

| | | | |
|---|---|---|---|
| 3,690,731 | 9/1972 | Mylting ................................ | 414/139.4 |
| 3,707,998 | 1/1973 | Dalrymple . | |
| 3,832,833 | 9/1974 | Cox . | |
| 3,867,969 | 2/1975 | Garnett ................................. | 414/291 |
| 3,990,567 | 11/1976 | Siwersson et al. ................... | 414/140.7 |
| 4,182,591 | 1/1980 | Stanelle ................................ | 414/291 |
| 4,252,493 | 2/1981 | Ilse ...................................... | 414/291 |
| 4,284,369 | 8/1981 | Gsponer et al. ..................... | 414/140.9 |
| 4,312,388 | 1/1982 | Hager et al. . | |
| 4,509,960 | 4/1985 | Engel . | |
| 4,557,364 | 12/1985 | Ball ..................................... | 414/291 |
| 4,666,472 | 5/1987 | Klimczak et al. . | |
| 4,699,187 | 10/1987 | Binzen . | |
| 4,714,097 | 12/1987 | Binzen et al. . | |
| 5,001,807 | 3/1991 | Arai . | |
| 5,322,405 | 6/1994 | Swensson et al. ................... | 414/137.1 |
| 5,813,815 | 9/1998 | Fang et al. .......................... | 414/137.1 |

FOREIGN PATENT DOCUMENTS

| | | | |
|---|---|---|---|
| 345158 A1 | 12/1989 | European Pat. Off. ............. | 414/291 |
| 3601212 A1 | 7/1987 | Germany ............................. | 414/291 |

*Primary Examiner*—Robert J. Warden, Sr.
*Assistant Examiner*—Andrew Aldag
*Attorney, Agent, or Firm*—Harness, Dickey & Pierce, PLC

[57] ABSTRACT

A fugitive dust collection system includes a dust collecting suction unit which is connected to a hood through a flexible hose. The hood surrounds an unloader for unloading bulk cargo of a dusty nature from the cargo hold of a ship or barge. The dust collection system forms a vertical curtain of air which absorbs a dust cloud or air borne contaminants and transports them to the dust collecting suction unit through the flexible conduit.

3 Claims, 2 Drawing Sheets

FUGITIVE DUST COLLECTOR

FIELD OF THE INVENTION

The present invention relates generally to the control of air borne particulate matter. More particularly, the present invention relates to the containment and capture of dust laden air in an open area, such as, for example the open area above and around an unloader for ships, barges and the like.

BACKGROUND OF THE INVENTION

During the loading and unloading of ships and barges which involves granular or powder-like cargos, dust laden air escapes periodically from the cargo hole and may be blown considerable distances into the surrounding environment. Such fugitive dust creates serious air pollution problems in urban port location and thus the fugitive dust must be contained if the marine terminal wants to continue its operation. The size of the cargo hold in ships and barges and the variables created by their differing dimensional openings as well as the influence of crosswinds, cause problems for the marine terminals in successfully containing the fugitive dust using any type of present day dust collection equipment.

Various approaches have been proposed in an attempt to contain these fugitive dust particles during ship and barge unloading operations. Some prior art systems create a vacuum within a discharge conduit which is in the ship's or barge's hold. Other prior art systems provide a vacuum immediately adjacent the loading chutes in an effort to contain the fugitive dust particles. Still other prior art systems enclose the entire area adjacent to a hopper and then contain the fugitive dust particles through the use of air streams and dust collection suction devices. Additionally, other prior art systems create an air curtain across the open hold to contain the dust particles and then, through the use of a negative draft dust collection module, the fugitive dust within the open hold is contained.

While these prior art devices have been somewhat satisfactory in containing the fugitive dust particles, their use has been limited to the specific locations immediately adjacent the loading chutes or they have the problem that the assembly and movement of these devices to the various open holds is a time consuming and complicated process. Thus, there is a need in the art for a fugitive dust collection system which is simple to use and move between the various open holds while at the same time is effective in the containment of the fugitive dust particles in order to limit the damage to the surrounding environment.

SUMMARY OF THE INVENTION

The present invention provides the art with a fugitive dust collection system which is easily located adjacent an open hold, is easily moved between open holds and which effectively contains any fugitive dust particles attempting to escape into the surrounding environment. The fugitive dust collection system of the present invention comprises a hood or shroud which is positioned over the unloader to collect and thus contain any fugitive dust particles. The hood or shroud is of a sufficient diameter that nearly all of the fugitive dust particles are contained but the overall size of the system permits it to be easily maneuvered within and between the various holds of the ships or barges.

Other advantages and objects of the present invention will become apparent to those skilled in the art from the subsequent detailed description, appended claims and drawings.

BRIEF DESCRIPTION OF THE DRAWINGS

In the drawings which illustrate the best mode presently contemplated for carrying out the present invention.

DETAILED DESCRIPTION OF THE PREFERRED EMBODIMENT

Figures 1, 2:
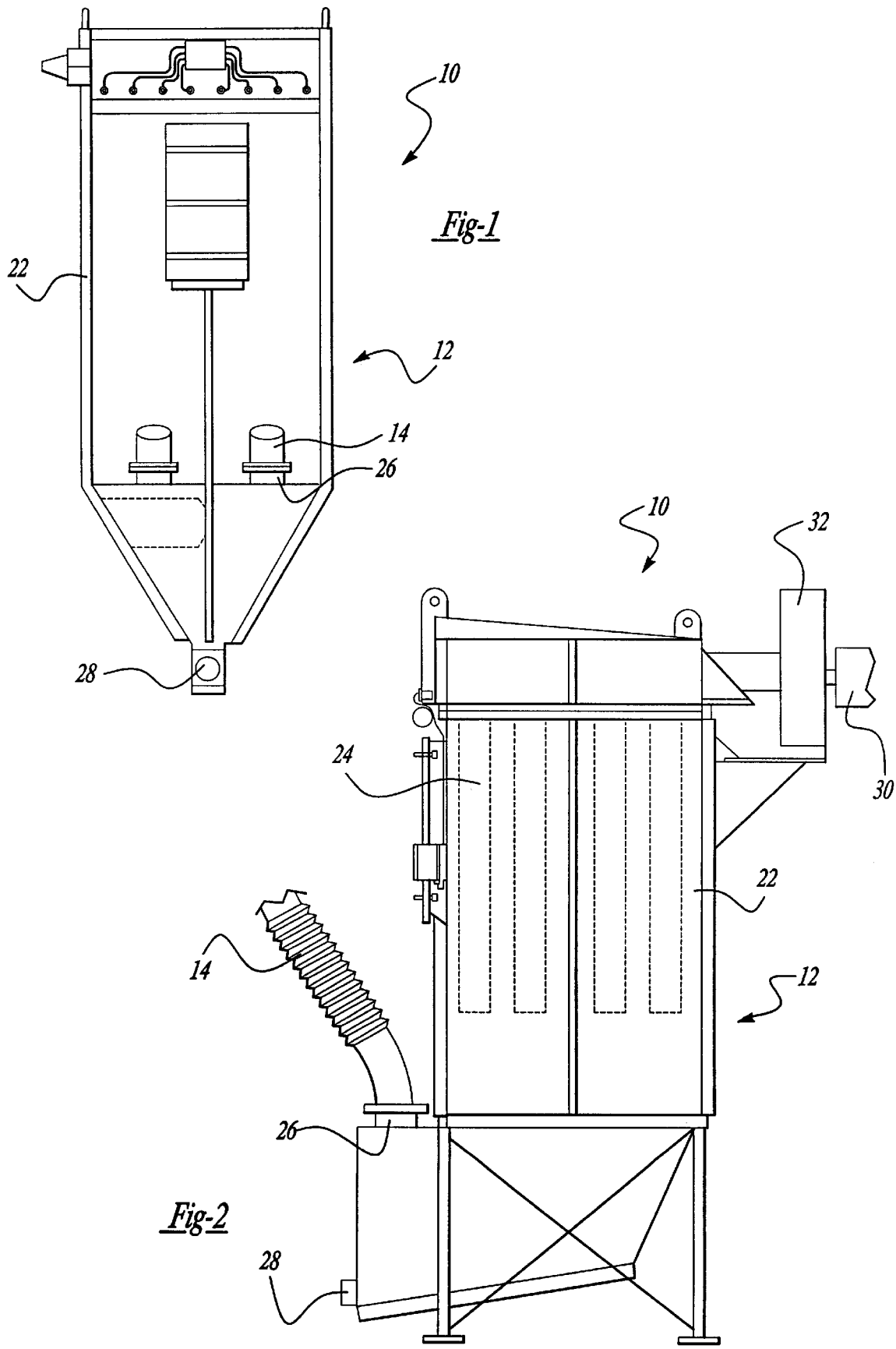
FIG. 1 is a side view of the dust collecting suction unit in accordance with the present invention.
FIG. 2 is an end view of the dust collecting suction unit illustrated in FIG. 1.
Figure 3:
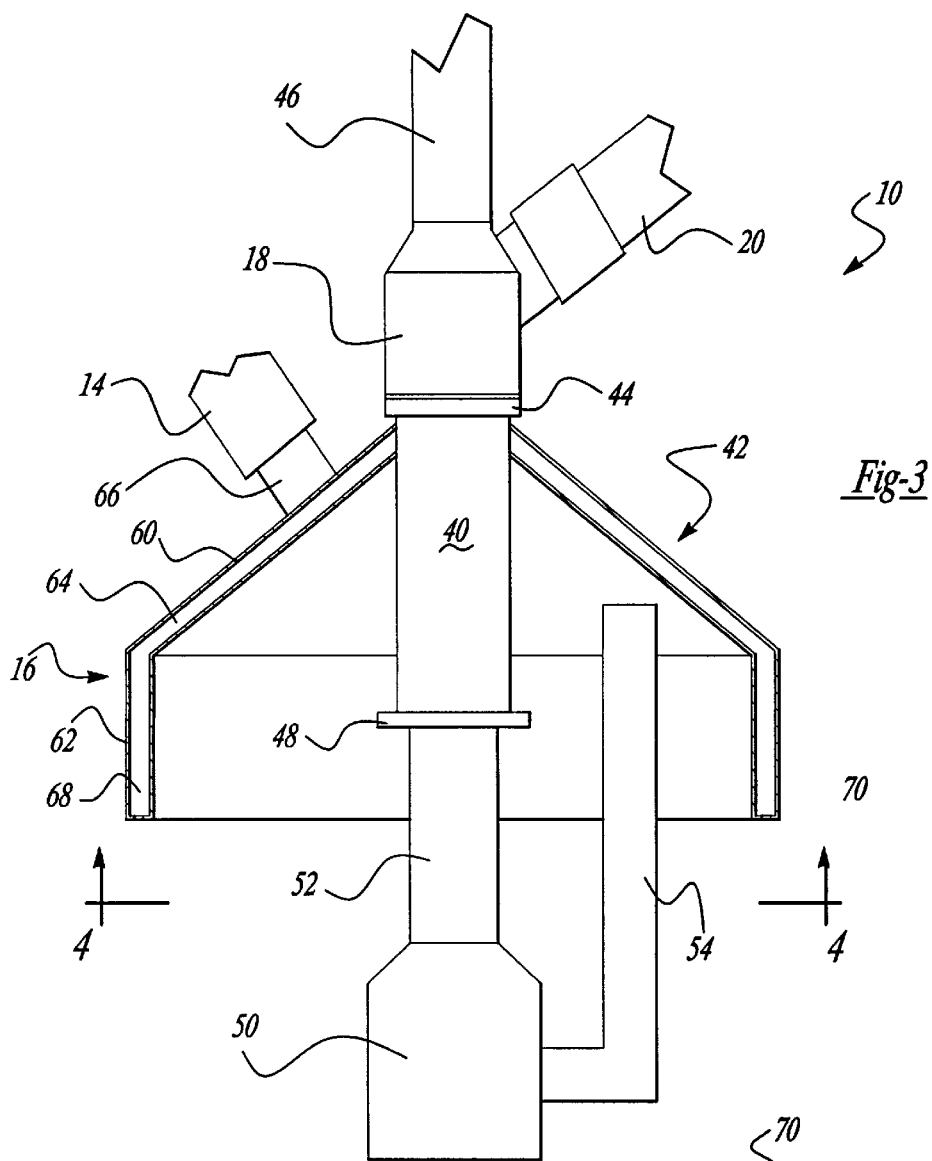
FIG. 3 is a side elevational view, partially in cross section of the hood and unloader in accordance with the present invention.
Figure 4:
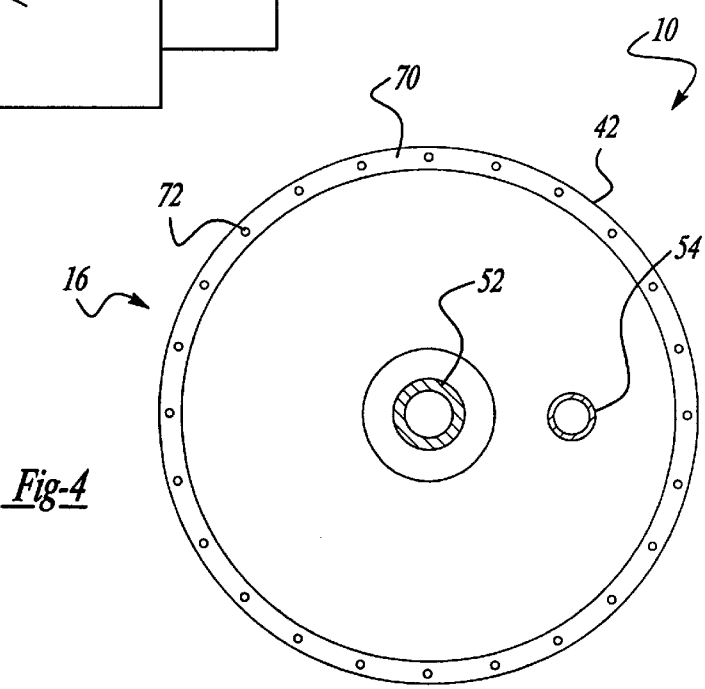
FIG. 4 is a cross sectional bottom plan view of the hood and unloader shown in FIG. 3.

Referring now to the drawings in which like reference numerals designate like or corresponding parts throughout the several views, there is shown in FIGS. 1–4, a fugitive dust collection system in accordance with the present invention which is designated generally by the reference numeral 10. The fugitive dust collection system comprises a barge unloading dust collecting suction unit 12, a flexible hose 14 and a hood assembly or shroud assembly 16 which is shown assembled to a conventional unloader 18. Unloader 18 is designed to unload a particulate bulk cargo from an open cargo hold of a ship. Typically, the cargo which unloader 18 is designed to unload is of a dusty nature such as cement, phosphate, lime, bauxite and other ores, coal, various types of grain and the like. As unloader 18 removes the cargo upward through a flexible hose 20, depressions are formed in the cargo remaining in the hole. These large depressions periodically result in cave-ins which generate clouds of fugitive dust surrounding unloader 18. Fugitive dust collection system 10 has been developed in order to contain the clouds of fugitive dust which are generated by unloader 18.

Dust collecting suction unit 12 is a typical suction unit which is utilized in the marine terminal environment for containing air borne particulate matter. Suction unit 12 comprises a housing or hopper 22 having a plurality of filters 24, a contaminated air inlet 26, a dust discharge outlet 28 and a clean air outlet 30. As is known in the art, contaminated air enters contaminated air inlet 26, flows upward within housing 22 to the plurality of filters 24. The air flows through the plurality of filters 24, and flows out of housing 22 through air outlet 30. A fan 32 provides the necessary vacuum within housing 22 to move the air through suction unit 12. The contaminant within the air is captured by the plurality of filters 24 where it eventually falls to the bottom of housing 22. The contaminants are removed from housing 22 using dust discharge outlet 28. In order to facilitate the removal of contaminants from the plurality of filters 24 and housing 22, means are provided for directing a reverse flow of compressed air into the downstream end of the plurality of filters 24. The operation and function of suction unit 12 is well known in the art and will therefore not be discussed further.

Contaminated air inlet 26 of suction unit 12 is connected to hood assembly 16 using flexible hose 14. In the preferred embodiment, flexible hose 14 is an eight inch inside diameter flexible wire reinforced neoprene hose. Flexible hose 14 is long enough and flexible enough to allow normal movement for unloader 18 to freely move throughout the unloading area and the various cargo holds of ships and barges during the unloading operation.

Hood assembly 16 comprises an unloader pipe 40 and a hood 42. Unloader pipe 40 includes an upper flange 44 which is connected to an unloading conduit 46 which leads to a conventional type unloading system (not shown). Unloading conduit 46 is depicted as an unloading conduit for a suction type of unloader. It is to be understood that the dust collection system of the present invention can be used with other types of unloaders including but not limited to the enclosed screw type unloader or other types of unloading systems known in the art. Unloader pipe 40 also includes a lower flange 48 which is attached to an unloader head 50 which extends below the bottom of hood 42. Unloader head 50 comprises a tubular portion 52 which extends below hood 42 and an air supply tube 54 which communicates with the interior of tubular portion 52 near its lower end and extends upward generally parallel to tubular portion 52 to open to the interior portion defined by hood 42.

Open hood 42 comprises a frusto conical shaped upper portion 60 and a generally cylindrical portion 62. Frusto conical shaped upper portion 60 defines an internal chamber 64 which is closed at its upper end where it mates with unloader pipe 40. An air outlet fitting 66 is open to internal chamber 64 and is used to connect flexible hose 14 to hood assembly 16 such that the inner channel of flexible hose 14 is in communication with internal chamber 64. Generally cylindrical portion 62 defines an internal chamber 68 which is in communication with internal chamber 64 of upper portion 60 at its upper end and is closed off at its lower end by a wall 70. A plurality of circumferentially spaced holes 72 extend through wall 70 to allow communication between the outside environment and internal chamber 68 of cylindrical portion 62.

Fugitive dust collection system 10 operates to contain any clouds of fugitive dust which surround unloader 18. Prior to unloading cargo from the cargo hold of a ship or barge, fan 32 is activated which draws a vacuum causing air flow into housing 22 and through filters 24. This in turn causes air flow through contaminated air inlet 26 and through flexible hose 14. The air flow through flexible hose 14 causes air flow through internal chamber 64, through internal chamber 68 and through the plurality of holes 72 to create a generally vertical curtain of air flowing around unloader head 50 of unloader 18 and into the plurality of holes 72 where it is directed into suction unit 12. As tubular portion 52 of unloader head 50 is brought into contact with the particulate bulk cargo, any air borne contaminants which are created by this contact or any air borne contaminants which are created by the various cave-ins of the particulate bulk cargo are absorbed by the vertical curtain of air flowing around unloader 18. The vertical curtain of air picks up the air borne contaminants, routes them through holes 72, through internal chamber 68, through internal chamber 64, through outlet fitting 66, through flexible hose 14 and into suction unit 12 via contaminated air inlet 26. The diameter of cylindrical portion 62 of hood 42 is sized to ensure that the air borne contaminants generated by unloader 18 are contained but it is not over-sized to the point of significantly interfering with the normal movements required of unloader 18. In the preferred embodiment, for an unloader 18 using an eight inch pipe, cylindrical portion 62 has a sixty inch outside diameter and a wall thickness for internal chamber 68 of three inches. Thirty-six holes 72 are circumferentially spaced around wall 70 with each hole being one and one-quarter inches in diameter.

While the above detailed description describes the preferred embodiment of the present invention, it should be understood that the present invention is susceptible to modification, variation and alteration without deviating from the scope and fair meaning of the subjoined claims.

What is claimed is:

1. An unloading system comprising:

an unloader;

a dust collection suction unit; and a fugitive dust collection system comprising:

a hood disposed around said unloader, said hood defining an interior space and an internal chamber surrounding said interior space, said unloader being disposed within said interior space, said hood comprising a frusto-conical portion defining a frusto-conical portion of said internal chamber and a cylindrical portion defining a cylindrical portion of said internal chamber, a plurality of holes being located within said cylindrical portion; and a flexible hose extending between said hood and said suction unit, said flexible hose providing communication between said internal chamber and said suction unit.

2. The unloading system according to claim 1 wherein, said unloader extends through said interior space to a position below said hood.

3. A fugitive dust collection system comprising:

a dust collection suction unit;

a hood disposed remote from said dust collection suction unit, said hood defining an interior space and an internal chamber surrounding said interior space, said hood comprising a frusto-conical portion defining a frusto-conical portion of said internal chamber and a cylindrical portion defining a cylindrical portion of said internal chamber, a plurality of holes being located within said cylindrical portion; and a flexible hose extending between said hood and said suction unit, said flexible hose extending between said suction unit and said internal chamber.

\* \* \* \* \*